July 5, 1927.
D. M. REEVES
1,634,961
PRESSURE RESPONSIVE DEVICE
Filed March 12, 1923
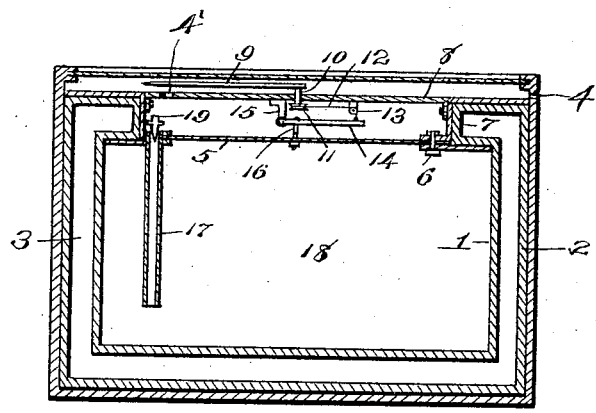
Inventor
Dacke M. Reeves
By Robert H. Young.
Attorney Patented July 5, 1927.

1,634,961

UNITED STATES PATENT OFFICE.

DACHE M. REEVES, OF BELLEVILLE, ILLINOIS.

PRESSURE-RESPONSIVE DEVICE.

Application filed March 12, 1923. Serial No. 624,678.

This invention relates to pressure responsive devices, such for example, as rate of climb indicators.

The object of the invention is to thermally insulate a device of the character referred to, or in other words, a device in which the main air cell is insulated from the heat of the outside atmosphere, combined with a diaphragm forming a wall of said shell and flexible under varying pressures and operatively combined with indicating means. The device may also comprise an air leak of capillary dimensions having adjusting means, when used as an instrument in which said air leak is necessary.

A further object of the invention is to provide a device of the character referred to in which compactness and portability are obtained, adapting the instrument especially for aircraft and balloon work; also, to increase the sensitivity of the device and at the same time obtain greater accuracy, simplicity and ease of assembly and repair.

With the above and other objects in view, the invention consists in the novel construction, combination and arrangement herein fully described, shown and claimed.

The accompanying drawing represents a sectional view of the improved rate of climb indicator.

One of the main features of the rate of climb indicator resides in a hollow double walled shell, comprising an inner wall 1 and an outer wall 2, said walls being arranged in spaced relation to each other to leave an intervening insulating space 3 which extends throughout all sides of the shell as indicated in the drawing. The shell may be formed of any suitable material best adapted for the purpose and by reason of its construction, and by the formation of a vacuum in the space 3, the interior of the shell is thermally insulated from the outside atmosphere.

The shell 1 has its upper end closed by means of a diaphragm 5, which is shown secured by fastening means 6 to a collar or frame 7, and which is mounted so as to make the shell airtight. A dial 8 is mounted in spaced relation to and above the diaphragm 5 and is graduated or calibrated in any suitable manner. Arranged to sweep around and over the dial 8 is an indicator hand or pointer 9 fastened on a short arbor 10 passing through the dial 8 and having a drum or pulley 11 on its inner end, around which is wrapped a thread 12 passing over a guide pulley 13 and attached to the free end of a lever 14 which is fulcrumed at one end on a small bracket 15 on the dial 8. A link 16 connects the lever 14 with the diaphragm 5 so that as the diaphragm moves, a rotary motion is imparted to the indicator hand 9. The dial 8 may be mounted for rotative movement (not shown) in the collar or frame 7 so that by turning the dial the instrument may be set so that the hand 9 will register with zero as is the common practice in the adjustment of altimeters for various altitudes of the earth above sea level. The dial 8 and pointer 9, may be painted with suitable luminous material to permit the instrument to be read in the dark. An air inlet 4 is arranged in the outer casing and an additional air inlet in the dial 8.

17 designates an air leak, the inner end of which is arranged in the air chamber 18 of the shell and the outer end of which communicates with the outside atmospheric pressure through said apertures 4 and 4'. Any suitable adjustable valve such as indicated at 19 is arranged to control the rapidity of the air leak which is of capillary dimensions.

The operation of the pressure responsive device when used as a rate of climb indicator is as follows:

During ascent, the atmospheric pressure falls, but as the difference between atmospheric pressure and the pressure in the air chamber is not at once equalized, the diaphragm is deflected outwardly. During descent, the outside air becomes of greater density and this causes the diaphragm to be deflected inwardly until the difference in pressure is equalized through the capillary air leak. The position of the indicator hand 9, brought about by the operation of the diaphragm 5, indicates accurately the rate of climb and also the rate of descent.

The air chamber 18 is of maximum size in relation to the size of the instrument as a whole. The air chamber is thermally insulated from temperature effects. The use of a single diaphragm is simpler than the use of aneroid or sylphon cells and more accurate. By employing a collar of different size and a smaller area of diaphragm, greater deflection of the diaphragm may be obtained.

The instrument is of a very rugged type and therefore less liable to get out of adjustment.

I claim:

In an instrument for measuring the rate of variance in atmospheric pressure, an outer casing, a shell in the casing having an open end, a diaphragm extending across the open end of said shell forming together with the inner wall of said shell an air chamber of maximum size relative to the instrument as a whole, an air inlet in said casing for admitting air to the outer face of said diaphragm, a capillary air leak into said air chamber, an indicating arm and means between said arm and said diaphragm for transmitting the motion of said diaphragm to said arm.

In testimony whereof I affix my signature.

DACHE M. REEVES.